United States Patent [19]
Tanaka

[11] Patent Number: 5,724,123
[45] Date of Patent: Mar. 3, 1998

[54] DISTANCE MEASURING EQUIPMENT FOR DETECTING A SCANNING DIRECTION

[75] Inventor: Shoichi Tanaka, Tokyo, Japan

[73] Assignee: Mitsubishi Denki Kabushiki Kaisha, Tokyo, Japan

[21] Appl. No.: 575,223

[22] Filed: Dec. 20, 1995

[30] Foreign Application Priority Data

Jun. 22, 1995 [JP] Japan .................. 7-155953

[51] Int. Cl.$^6$ ................................. G01C 3/08
[52] U.S. Cl. .................................... 356/5.01
[58] Field of Search ............... 356/4.01, 5.01, 356/3.09, 141.1

[56] References Cited

U.S. PATENT DOCUMENTS

| | | | |
|---|---|---|---|
| 5,515,156 | 5/1996 | Yoshida et al. | 356/5.01 |
| 5,552,893 | 9/1996 | Akasu | 356/5.01 |
| 5,604,580 | 2/1997 | Uehara | 356/28 |
| 5,625,447 | 4/1997 | Kikuchi et al. | 356/4.01 |

FOREIGN PATENT DOCUMENTS

| | | |
|---|---|---|
| 175390 | 7/1991 | Japan . |
| 137867 | 5/1994 | Japan . |

*Primary Examiner*—Mark Hellner
*Attorney, Agent, or Firm*—Sughrue, Mion, Zinn, Macpeak & Seas, PLLC

[57] ABSTRACT

A distance measuring equipment which can detect a beam sending direction with a compact and simple structure is provided.

The distance measuring equipment is equipped with a scanning means which swings a reflection means in a predetermined range to scan a beam, an original point detecting means which detects the original point as a reference position of the reflecting means, and a beam sending direction operating means which calculates a direction of the sending beam reflected by the reflecting means based on a detected output from the original point detecting means.

6 Claims, 5 Drawing Sheets

DISTANCE MEASURING EQUIPMENT FOR DETECTING A SCANNING DIRECTION

BACKGROUND OF THE INVENTION

1. Field of the Invention

The present invention relates to a distance measuring equipment to detect a distance to and a direction of an obstacle by emitting a laser beam for scanning to receive the beam reflected by the obstacle.

2. Discussion of Background

Figure 6:
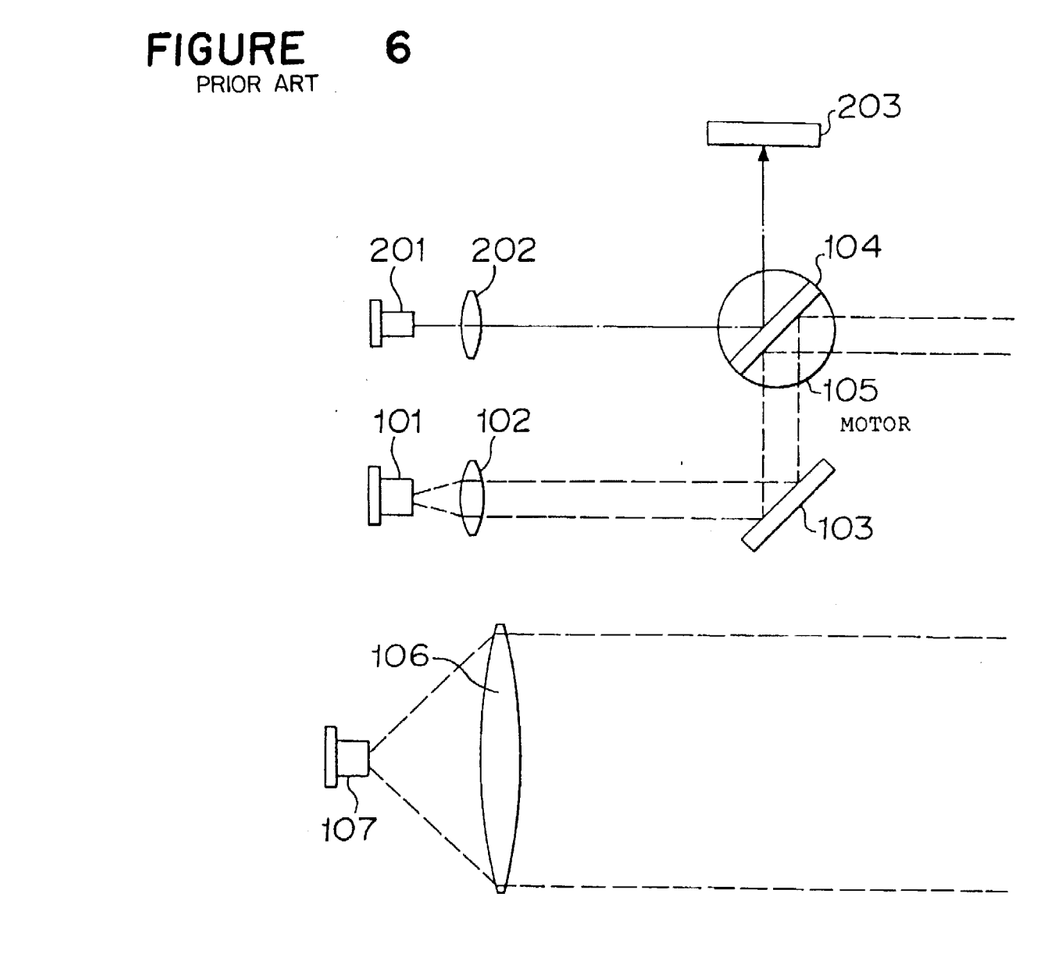
FIG. 6 shows the structure of the conventional device.

FIG. 6 shows a conventional distance detecting device disclosed in, for example, Japanese Unexamined Patent Publication No. 137867/1994. In FIG. 6, a numerical reference 101 designates a laser diode for distance measurement which generates a beam for distance measurement; a numerical reference 102 designates a lens which converges the beam generated by the laser diode 101 for distance measurement; a numerical reference 103 designates a fixed mirror which reflects the beam transmitted through the lens 102; a numerical reference 104 designates a rotatable mirror which reflects and sends outward the beam reflected by the fixed mirror 103 wherein the rotatable mirror has mirror surfaces on both sides; a numerical reference 105 designates a motor which holds the rotatable mirror 104 in a rotatable manner and rotates it; a numerical reference 106 designates a lens which receives and converges the beam for distance measurement which is reflected and returned by an obstacle (not shown); a numerical reference 107 designates a light receiving element which receives the reflected beam converged by the lens 106; a numerical reference 201 designates a laser diode for scanning position detection which generates a beam for scanning position detection; a numerical reference 202 designates a lens for converging the beam emitted from the laser diode for scanning position detection 201; and a numerical reference 203 designates a position sensitive device (PSD) which detects an incident position of the beam for scanning position detection reflected by the back surface of the rotatable mirror 104.

Next, the operation of the conventional distance detecting device is explained. The rotatable mirror 104 having reflection surfaces at both sides is rotated within a predetermined range of angle by the motor 105. The beam for distance measurement from the laser diode 101 is converged by the lens 102, and reflected at the fixed mirror 103 and rotatable mirror 104 to be directed outside. The beam reflected by the obstacle is converged by the lens 106 and received by the light receiving element 107. The distance to the obstacle is measured based on a time from the emission of the beam for distance measurement to the reception of the reflected beam.

The scanning direction is detected by the conventional distance detecting device as follows. The beam emitted from the laser diode for scanning position detection 201 is reflected on the back surface of the rotatable mirror 104 and is received by the position sensitive device 203. The position sensitive device 203 outputs a position signal which represents the incident position corresponding to the position where the beam is received, whereby the direction of the beam for distance measurement scanned by the rotatable mirror 104 is detected. A feedback control is performed for the motor 105 by using the position signal.

In the conventional distance detecting device, a position sensitive device (PSD) was used to determine a position of a rotatable mirror. Accordingly, in order to detect an accurate scanning angle, it was necessary to obtain a resolving power of angle by keeping a sufficient distance between the rotatable mirror and the position sensitive device. Therefore, the position detecting means should have a certain volume, which resulted in a large-sized device. Further, the position sensitive device (PSD) should cover a wide area so that it was able to detect the whole range of scanning angle. This caused a cost increase and a large-sized device.

Further, in order to detect accurately the position of the rotatable mirror, the width of the beam incident in the position sensitive device should be narrow and an optical system using a lens which converges the beam from the laser diode was necessary. Also the distance between the laser diode and the lens had to be determined very accurately in order to obtain a narrower beam width. Thus, a high accurate optical system inclusive use for detecting the position was necessary.

SUMMARY OF THE INVENTION

The present invention is to solve the above-mentioned problems inherent to the prior art.

It is an object of the present invention to provide a distance measuring equipment of small-size and a simple structure, which is capable of detecting a direction of a beam.

Another object of the present invention is to provide a distance measuring equipment which can detect an accurate scanning direction in spite of a change of temperature and vibrations.

Another object of the present invention is to provide a distance measuring equipment which can detect a fault in the equipment by judging abnormality in the distance measuring equipment.

According to the present invention, there is provided a distance measuring equipment which comprises a beam sending means for sending a beam, a reflecting means for sending by reflection the beam from the beam sending means in a predetermined direction and reflects in a predetermined direction a reflection beam which is resulted from the reflection of the beam at an obstacle, a scanning means which swings the reflecting means in a predetermined range to scan the beam, a beam receiving means which receives the beam reflected by the reflecting means, a distance operation means which calculates a distance to the obstacle based on a deferred time period from the time point when the beam sending means sends the beam to the time point when the beam receiving means receives the reflected beam, an original point detecting means which detects an original point as a reference position of the reflecting means, and a beam sending direction operating means which calculates the beam sending direction of the beam by the reflecting means based on an output from the original point detecting means.

In the distance measuring equipment as described above, the beam sending direction operating means judges that the reflecting means is located at a starting position of scanning a predetermined time after the time point when the original point detecting means has detected the original point.

In the distance measuring equipment as described above, the scanning means has a stepping motor; and the beam sending direction operating means judges that the reflecting means is located at the starting position of scanning when an exciting phase of the stepping motor becomes a predetermined phase after the original point detecting means has detected the original point.

In the distance measuring equipment as described above, the scanning means is to scan succeedingly from the starting position of scanning in a predetermined direction, and is returned to the starting position of scanning in one cycle of an excitation pattern of the stepping motor after finishing the scanning of a predetermined range.

In the distance measuring equipment as described above, it further comprises an abnormality detecting means which counts a time from the time point of previously detecting the original point to the time point of detecting the original point at present; and judges that there is abnormality when the counted time is not within a predetermined range.

In the distance measuring equipment as described above, it comprises an abnormality detecting means which judges that there is abnormality when the exciting phase of the stepping motor is a phase other than a predetermined phase in a case that the original point detecting means detects the original point.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DETAILED DESCRIPTION OF THE PREFERRED EMBODIMENTS

The present invention will be described in more detail.

A distance measuring equipment according to the present invention detects an original point as a reference position of a reflecting means and calculates a direction of forwarding a beam with respect to the reflecting means based on the original point.

A distance measuring equipment according to the present invention judges that a reflecting means is located at a starting position of scanning when a predetermined time is passed after an original point detecting means has detected original point.

A distance measuring equipment according to the present invention judges that a reflecting means is at a starting position of scanning in case that an excitation phase of a stepping motor becomes a predetermined phase after an original point detecting means has detected an original point.

A distance measuring equipment according to the present invention performs scanning succeedingly from a starting position of scanning in a predetermined direction, and returns in every one-cycle of an excitation pattern a reflecting means to the starting position of scanning after scanning for a predetermined range has been finished.

A distance measuring equipment according to the present invention counts a time from detection of the previous original point to detection of the present original point, and when the counted time is not in a predetermined range, it judges that abnormality occurs.

A distance measuring equipment according to the present invention judges that abnormality occurs in case that an excitation phase of a stepping motor is not a predetermined phase when an original point detecting means detected an original point.

Now, preferred embodiments of the present invention will be described in detail with reference to the drawings wherein the same numerical references are used for the same or the similar elements and description of these elements is omitted.

EMBODIMENT 1

Figure 1:
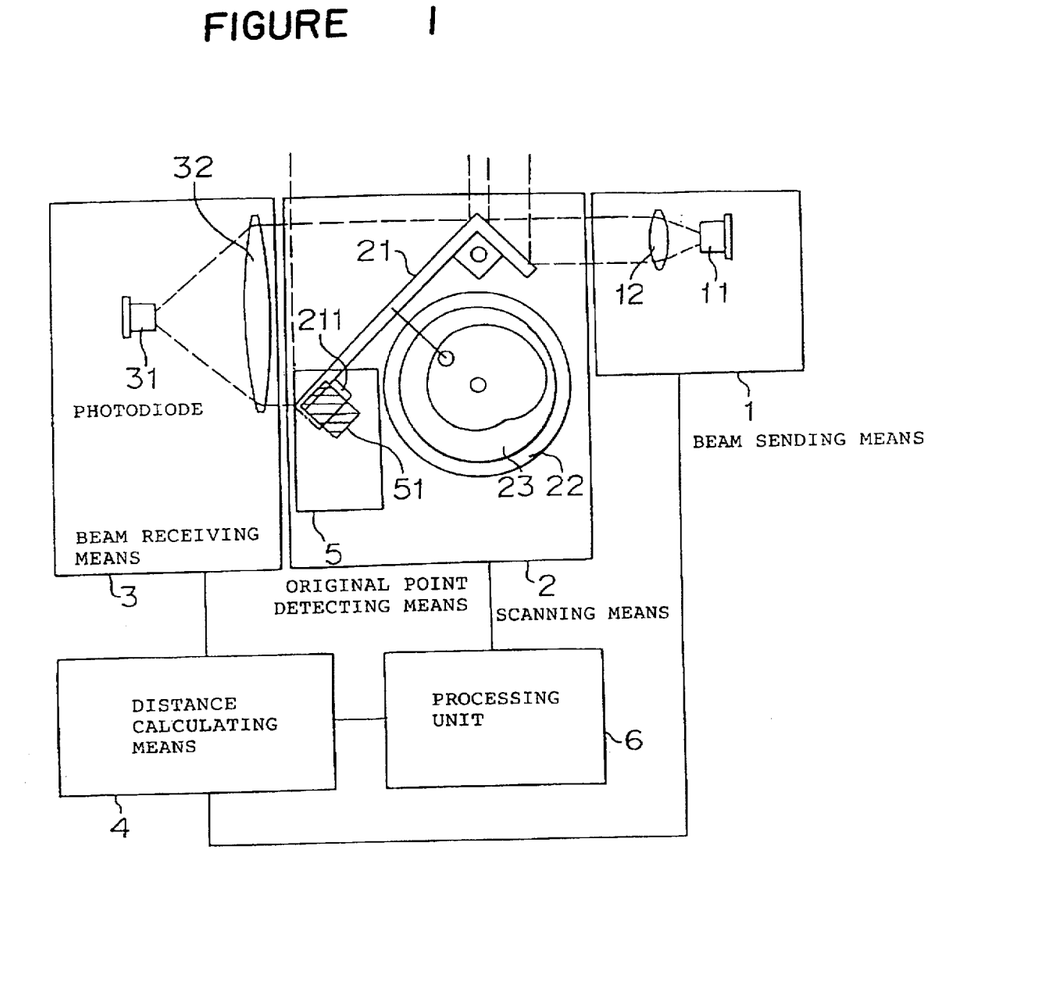
FIG. 1 is a diagram showing the structure according to a first embodiment of the present invention.

FIG. 1 is a diagram showing a structure of the distance measuring equipment according to a first embodiment of the present invention. The distance measuring equipment comprises a beam sending means composed of a laser diode 11 which generates a pulse laser beam and a beam sending lens 12 which converges the pulse beam emitted by the laser diode 11 so as to form a very narrow laser beam with respect to a scanning direction; a scanning means 2 having a mirror 21, as an L-shaped reflecting means, which sends by reflection the laser beam from the beam sending means 1 in a predetermined direction and receives a pulse beam which is the laser beam reflected by an obstacle (not shown) so that it reflects the pulse beam in a predetermined direction, a cam 23 and a stepping motor 22 which swings the mirror 21 within a predetermined range with the aid of the cam 23; a beam receiving means 3 having a lens 32 which converges the pulse beam reflected by the mirror 21 and a photodiode 31 which receives the beam converged by the lens 32 to convert it into an electrical signal; a distance calculating means 4 which measures a reciprocating time of the beam from the laser diode 11 to the reception of the reflected pulse beam by the beam receiving means 3 and calculates a distance; an original point detecting means 5 which detects an original point as a reference position of the mirror in the scanning means 2; and a processing unit 6 which processes data of distance measured for each angle. The processing unit 6 includes a beam sending direction operating means which calculates a sending direction of beam based on a detected output of the original point detecting means 5.

Next, the operation of the first embodiment is explained. The beam sending means 1 emits a pulse beam by driving the laser diode 11 in a pulse mode. Although the laser pulse beam generated from the laser diode 11 generally has a weak directivity, it can be formed to be a beam having a very narrow width with respect to a specified scanning direction, namely a horizontal direction, by converging the beam with use of the beam sending lens 12. The mirror 21 is driven by the stepping motor 22 through the cam 23 and sends the incident laser beam outside the device. The laser beam reflected by the beam sending surface of the mirror 21 is reflected by the obstacle, and the reflected laser beam is incident again as the reflected pulse beam into the mirror 21. The beam receiving surface of the mirror 21 reflects the reflected pulse beam and sends it to the beam receiving means 3. In the light receiving means 3, the reflected pulse beam is converged by the lens 32, and undergoes photo-electric conversion by the photodiode 31. The converted output is input into the distance calculating means 4. The distance calculating means 4 measures a time $\Delta t$ which is from the time of the emission of the laser diode pulse beam to the time of receipt of the reflected pulse beam by the beam receiving means 3, and calculates the distance to the obstacle by multiplying a half ($\frac{1}{2}$) of the measured time $\Delta t$ by the velocity of light ($3 \times 10^8$ m/s). The operation is repeated every time when the mirror 21 is driven to the scanning direction with predetermined time intervals.

Figure 2:
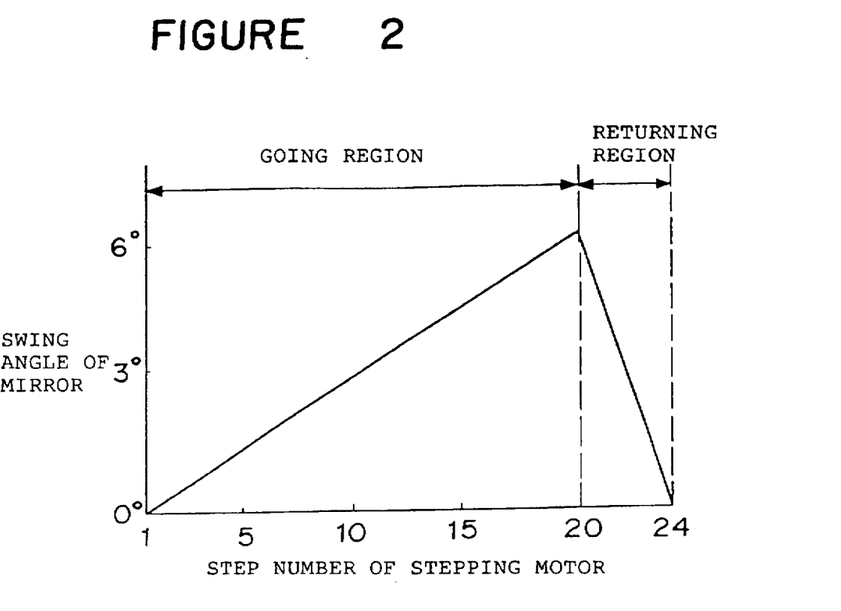
FIG. 2 is a graph for explaining the operation of a scanning means.

FIG. 2 is a diagram for explaining the operation of the scanning means 2, wherein step numbers of the stepping motor 22 and angles of the mirror 21 swung are shown. In the figure, a going region corresponds to a scanning region in which the distance is measured by sending the laser beam in the predetermined range. A returning region corresponds to a region in which the mirror 21 is returned to the scanning start position after scanning for the entire scanning region has been finished. In the returning region, the beam sending means 1 does not generate the pulse beam. The cam 23 has such a shape as to cause a swinging motion of the mirror 21 rotate in the going region in 20 steps and a returning motion in the returning region in 4 steps by a stepwise operation of the stepping motor 22. Therefore, one reciprocating (going and returning) motion of the swinging mirror 21 is conducted in 24 steps. A swing angle of one step of the stepping motor 22 is 15°, which corresponds to 0.3° of the swing angle of the mirror and to 0.6° of the scanning angle of the laser beam, which is the double of the swing angle of the mirror. Thus, the total scanning angle of the laser beam is 0.6°×20=12°.

Figure 3:
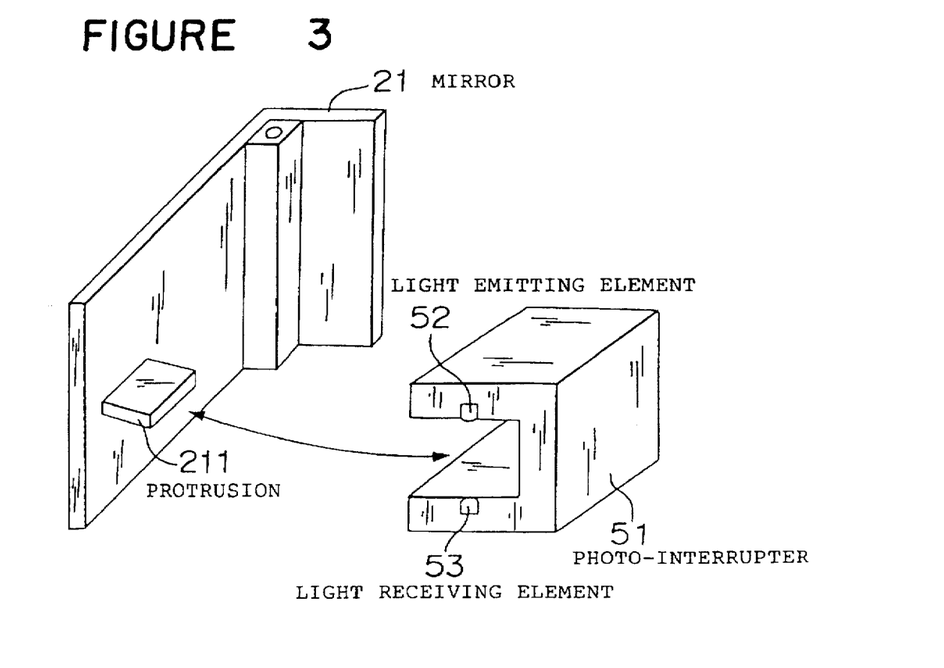
FIG. 3 is a schematic diagram showing the structure of an original point detecting means.

Next, a manner of calculating the sending direction of the beam according to the first embodiment is explained. The original point detecting means 5 is set so as to detect, for example, an end of the swinging mirror with a photo-interrupter or the like when the swinging mirror takes a certain position. FIG. 3 is a schematic diagram showing the structure of the original point detecting means 5. In the figure, a numerical reference 211 designates a protrusion provided on the back surface of the mirror 21. A numerical reference 51 designates a photo-interrupter. A numerical reference 52 designates a light emitting element. A numerical reference 53 designates a light receiving element which receives light from the light emitting element 52. The mirror 21 is driven to the rightward direction in the figure. When the protrusion 211 interrupts the light from the light emitting element, the position of the original point of the mirror 21 is detected.

Figure 4:
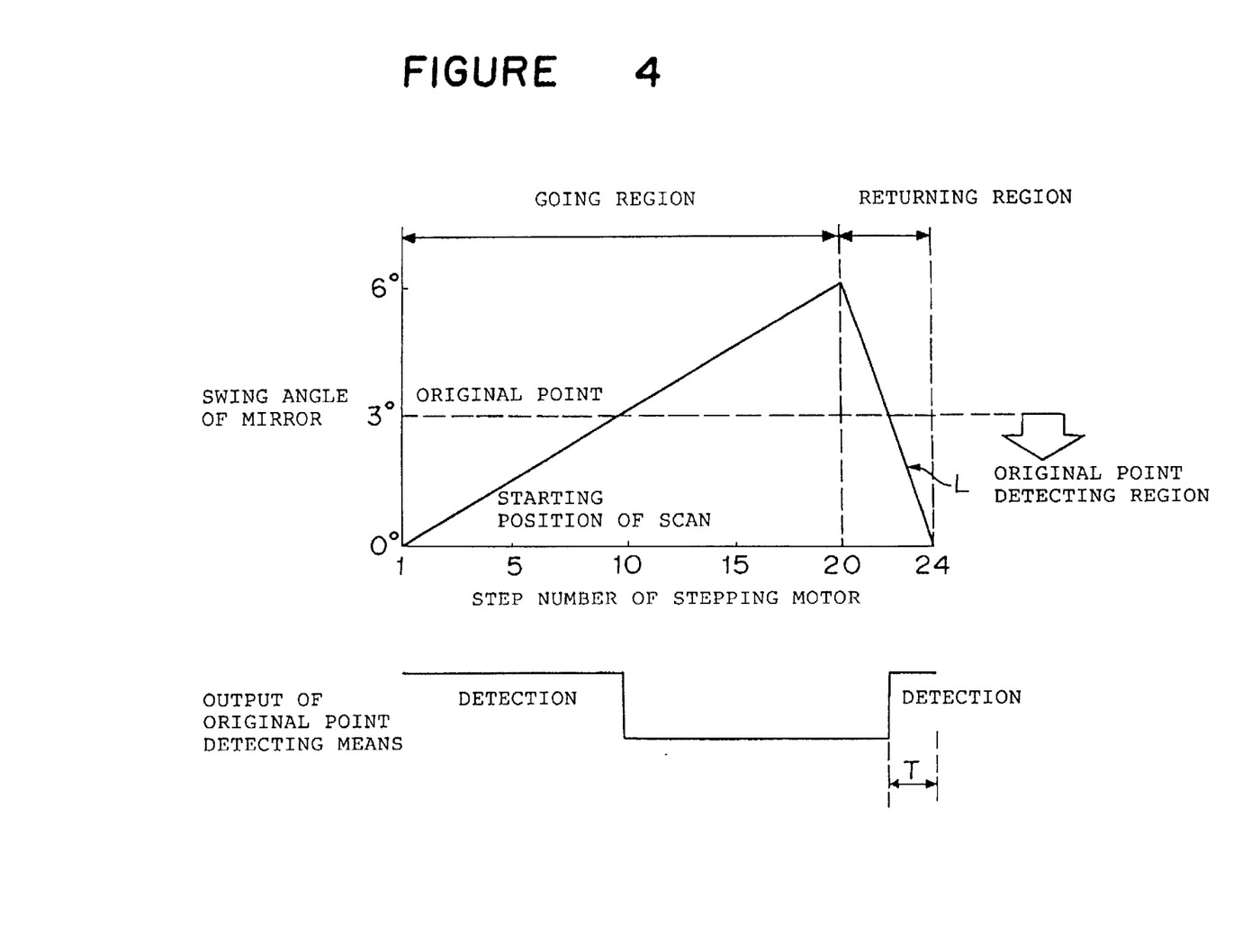
FIG. 4 is a graph for explaining the relationship between an original point and a starting position of scanning.

FIG. 4 is a graph for explaining the relationship between the original point obtained by the original point detecting means 5 and a starting position of scanning. As shown in FIG. 4, the original point is set at a position which is 3° apart from the starting position of scanning.

In FIG. 4, when the mirror 21 is at the starting position of scanning, the protrusion 211 is at the deepest position in a U-shaped channel (FIG. 3) to interrupt the light from the light emitting element 52. This situation means that the original point detecting means 5 outputs a signal of high (H) level. Then, the stepping motor 22 receives driving signals in succession to swing the mirror 21 in the leftward direction in FIG. 3. When the swing angle becomes 3°, the protrusion 211 is moved to a position where it does not interrupt the light from the light emitting element 52. Then, the light receiving element 53 can receive the light from the light emitting element 52, whereby the original point detecting means 5 outputs a signal of low (L) level in place of the signal of high (H) level. The mirror 21 is further swung in the leftward direction by 20 steps, and thereafter, swung in the rightward direction in FIG. 3. Then, the mirror 21 returns to the swing angle of 3°, whereby the original point detecting means 5 outputs the signal of H-level in place of the signal of L-level. A beam sending direction operating means judges that a time point when the output of the original point detecting means 5 is changed from the L-level signal to the H-level signal is the original point, and at the same time, it starts to count time, and judges that the mirror 21 is at the starting position of scanning after a predetermined time T has passed from the time point. The time T is determined depending on a period of the driving signal supplied to the stepping motor 22, the position where the original point is set, and so on.

As mentioned in the above, since the stepping motor 22 rotates 15° for each step, it makes the mirror 21 swing to scan the laser beam by 0.6°. Accordingly, the beam sending direction operating means judges that there is the starting position of scanning at the time point when the predetermined time T has passed after the detection of the original point, and counts the number of the driving signals which correspond to the number of steps to the stepping motor 22 with respect to the starting position of scanning. For instance, when there is a movement of 8 steps, it is understood that the pulse beams are emitted in a direction of 4.8° (0.6°×8) from the starting point of scanning. Namely, when the original point is detected, it is possible for the beam sending direction operating means to calculate the direction of the sending beam at the present time based on information of the original point.

The processing unit 6 outputs data of the distance to and the direction of the detected obstacle which correspond to the direction calculated by the distance calculating means 4 and the sending direction of the beam calculated by the beam sending direction operating means.

As mentioned in the above, the mirror which scans laser beam is swung by the combination of the stepping motor and the cam, and the scanning angle is determined by the shape of cam. Therefore, when a single point as the original point is detected through a motion of the mirror, the starting position of scanning from which a measurement of distance is started with a lapse of time after the detection of the original point is obtainable. The scanning angle is also obtainable. Thus, the original point detecting means can be simple in structure and compact.

In the conventional device, it was impossible to maintain the scanning angle to be constant at and around a time point at which a forward rotation is changed to a reverse rotation of the motor 105, or vice versa since the conventional device was so constructed as to rotate forwardly in the going region and backwardly in the returning region by applying a sinusoidal wave or a triangle wave to the motor 105. However, according to the first embodiment, it is possible to maintain the scanning angle to be constant because a variation of the scanning position can be arbitrarily determined by changing the shape of the cam.

EMBODIMENT 2

In the first embodiment, the judgment of the starting position of scanning is made at the time when the predetermined time has passed after the original point had been detected. In the second embodiment wherein a special attention should be paid to the stepping motor, the starting position of scanning is detected by using an excitation phase of the stepping motor after the original point is detected.

Figure 5:
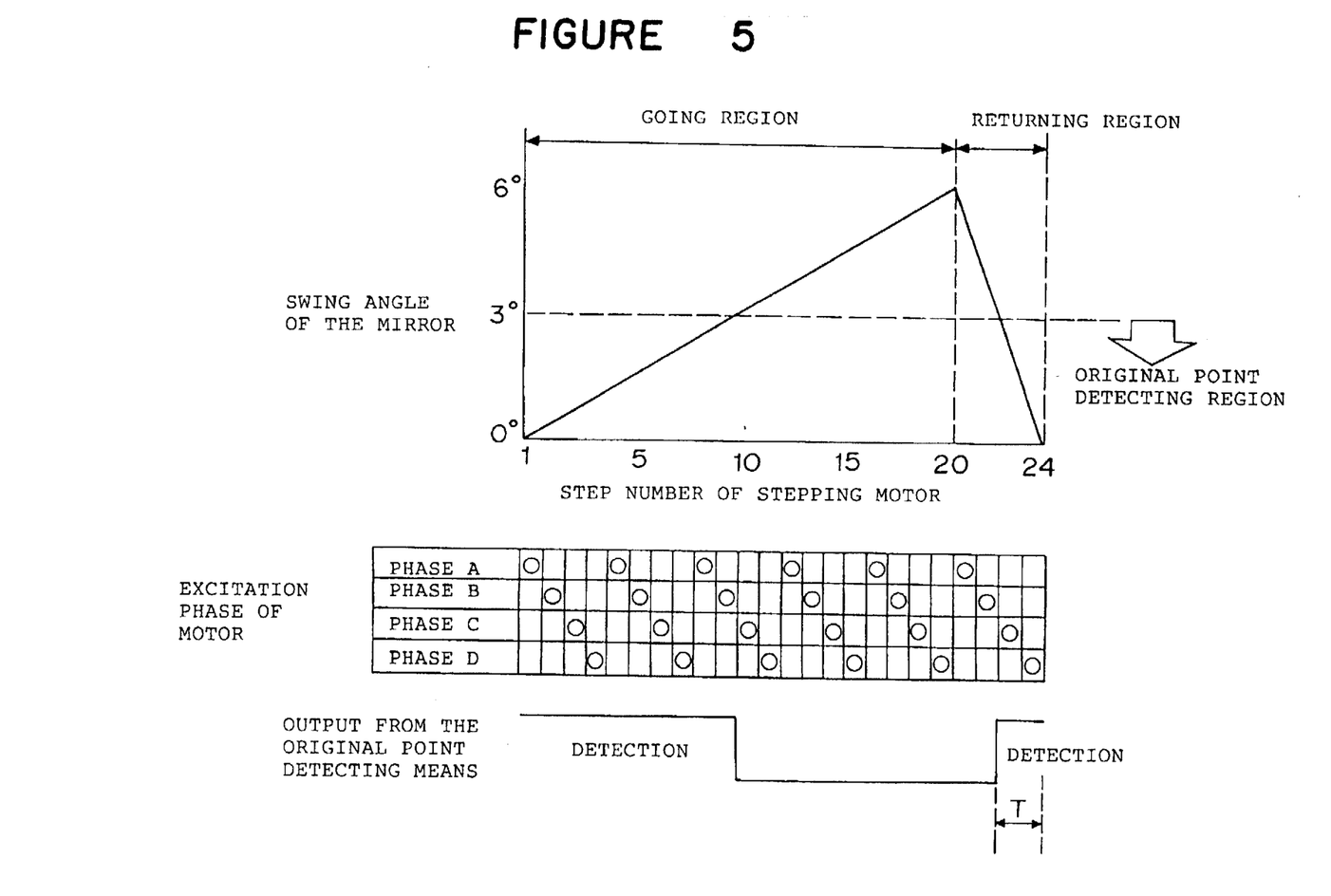
FIG. 5 is a graph for explaining an operation according to a second embodiment of the present invention.

FIG. 5 is a graph for explaining the operation of the second embodiment. As shown in the figure, the stepping motor 22 is driven in a predetermined direction by a predetermined angle (by a step), by the successive excitation in the order of a phase A, a phase B, a phase C and a phase D. As shown in the FIG. 5, the excitation phase of the stepping motor 22 is predetermined depending on the number of steps allowed for the stepping motor. In the motor shown in the second embodiment, for example, the excitation phase of the starting position of scanning is the phase A, wherein the swing angle of the mirror 21 is 0°. When the driving signals for 24 steps are applied to the motor, the motor rotates by one turn and as a result the excitation phase of the next starting position of scanning becomes the phase A. The reason is as follows. The motor according to this embodiment has 4 phases and is driven in a single phase excitation mode. Further, it is rotated by one turn with 6 cycles of an excitation pattern, wherein one cycle of the excitation pattern means through and successive excitation from the phase A to the phase D. However the number of steps, the excitation pattern, the cycles and so on are determined by a motor and an excitation method (e.g. mode) to be used.

In the second embodiment in consideration of above mentioned point, judgment is so made that when the excitation phase of the stepping motor 22 becomes the phase A after the position detecting means has detected the original point 5, the time point is deemed as the starting position of scanning from which the measurement of distance is effected.

According to the second embodiment, since the starting position of scanning from which the measurement of distance is started is determined by the excitation phase of the stepping motor after the position of the original point is detected, it is not necessary to count a time after the detection of the original point for detecting the starting position of scanning as required in the first embodiment. In the detection of the original point, the detection of a rough position is enough, and an accurate position is scarcely required. For example, even though a position obtained a predetermined time after the time point of the detection of the original point is deviated from the starting position of scanning, there is no risk of erroneous recognition that the deviated position is the starting position of scanning. Further, the device according to the second embodiment can detect an accurate sending direction of beam irrespective of other variable factors for detecting positions such as a temperature variation.

EMBODIMENT 3

The third embodiment is an improvement of the second embodiment. In the third embodiment, as shown in FIG. 5, the mirror 21 is returned to the starting position of scanning while it is swung in the almost entire range of swing in the returning region in one cycle (i.e. 4 steps) of an excitation pattern of the stepping motor 22. Since the returning region corresponds to one cycle of the excitation pattern of the stepping motor 22, each of the phase A through the phase D appears only once in the returning region. When the original point is detected, the excitation of the phases A and B has already been finished, wherein excitation of the phases C and D is done in the remaining returning region. Therefore, the excitation of the phase A after the detection of the original point is always at the next starting position of scanning. Accordingly, there is no possibility of erroneous determination that the phases A in the going region must be the next starting position of scanning for effecting the measurement of distance. Thus, the starting position of scanning can surely be detected without causing one cycle deviation of the excitation pattern of the stepping motor 22.

EMBODIMENT 4

The fourth embodiment relates to how to detect troubles in the distance measuring equipment. The equipment according to the fourth embodiment is provided with an abnormality detecting means in addition to the equipment according to the first embodiment. The abnormality detecting means is included in the processing unit 6.

The abnormality detecting means has a timing counter means which measures an elapsed time from the time point previously detected to the time point detected at present of original point of the mirror 21. The elapsed time is compared with a predetermined time range stored in the abnormality detecting means. The predetermined time range corresponds to a time required for 24 step driving to the stepping motor 22 wherein an allowable error range is considered. If the elapsed time is not within the predetermined time range as a result of the above mentioned comparison, the abnormality detecting means judges that there occurs abnormality such as an error in driving the stepping motor. When there is a judgment of abnormality, the distance data on that instant cycle are detected or the properly calculated data used in the previous cycle are used, for instance. Thus, if the abovementioned abnormality occurs due to vibrations, the distance data of any erroneous angle position are not adopted.

EMBODIMENT 5

The fifth embodiment relates to how to detect troubles in the distance measuring equipment. The equipment according to the fifth embodiment is provided with an abnormality detecting means in addition to the equipment according to the second embodiment. The abnormality detecting means is included in the processing unit 6. The abnormality detecting means judges whether or not an exciting phase of the stepping motor 22 is a predetermined phase at the time point when the original point of the mirror 21 is detected. A swing position of the mirror 21 corresponds mechanically to an exciting phase of the stepping motor 22. The exciting phase of the stepping motor 22 at the time point when the the original point is detected is always a predetermined phase. Accordingly, if an exciting phase of the stepping motor 22 at the time point when the the original point is detected is not the predetermined phase, the abnormality detecting means judges that there occurs abnormality such as an error in driving the stepping motor 22. Similar to the fourth embodiment, when the judgment of the abnormality is made, a treatment such as deleting the distance data on that instant cycle or putting the properly calculated data of the previous detection cycle are adopted.

As described in the above, since the distance measuring equipment according to the present invention comprises a scanning means which scans a beam by swinging a reflecting means in a predetermined range, an original point detecting means for detecting an original point as a reference position of the reflecting means, a beam sending direction operating means which calculates a sending direction of beam reflected by the reflecting means based on an output of the original point detecting means, the distance measuring equipment detect the sending direction of beam with a compact and simple structure.

In accordance with the distance measuring equipment according to the present invention, since it is equipped with the beam sending direction operating means which judges that the reflecting means is in a starting position of scanning when a predetermined time has passed after the detection of the original point by the original point detecting means, the starting position of scanning can be judged based on information of the original point irrespective of a type of motor used.

Further, since the distance measuring equipment according to the present invention has the scanning means comprising a stepping motor and the operation means for obtaining a beam sending direction, which judges that the reflecting means is positioned in the starting position of scanning when an exciting phase becomes a predetermined phase after the detection of the original point by the original point detecting means, the starting point of scanning can accurately be determined.

Further, since the distance measuring equipment according to the present invention has the scanning means which successingly scans from the starting point of scanning in a predetermined direction and returns to the starting point of scanning in a cycle of an exciting pattern of the stepping motor after finishing the scanning of a predetermined range, the starting point of scanning can accurately be determined.

Further, since the distance measuring equipment according to the present invention has an abnormality judgment means which counts a time from the time point of previously detecting the original point to the time point of detection of the original point at present and which judges that there is abnormality when a counted time is not within a predetermined range, the abnormality of the equipment can be detected.

Further, since the distance measuring equipment according to the present invention has the abnormality judgment means which judges that there is abnormality when an exciting phase is a phase other than a predetermined phase, the abnormality of the equipment can be accurately detected.

Obviously, numerous modifications and variations of the present invention are possible in light of the above teachings. It is therefore to be understood that within the scope of the appended claims, the invention may be practiced otherwise than as specifically described herein.

What is claimed is:

1. Distance measuring equipment comprising:

beam emitting means, reflecting means for reflecting the beam from the beam emitting means in a predetermined direction, and for reflecting in a predetermined direction a return beam which results from reflection of the beam by an obstacle, scanning means for moving the reflecting means in a predetermined range to scan the beam, beam receiving means for receiving the return beam reflected by the reflecting means, distance determining means for calculating a distance to the obstacle based on a time difference between the time of beam emission and reception of the return beam by said beam receiving means, origin detecting means for detecting an origin point as a reference position of the reflecting means, and beam emission direction determining means for calculating an emission direction of the beam from the reflecting means based on an output from the origin detecting means.

2. Distance measuring equipment according to claim 1, wherein the beam emission direction determining means judges that the reflecting means is located at a starting position of scanning when a predetermined time has passed from when the origin detecting means has detected the origin.

3. Distance measuring equipment according to claim 1, wherein:

the scanning means has a stepping motor; and the beam emission direction determining means judges that the reflecting means is located at the starting position of scanning when an exciting phase of the stepping motor becomes a predetermined phase after the origin detecting means has detected the origin.

4. Distance measuring equipment according to claim 3, wherein the scanning means succeedingly scans from the starting position of scanning in a predetermined direction, and is returned to the starting position of scanning in one cycle of an excitation pattern of the stepping motor after finishing the scanning of a predetermined range.

5. Distance measuring equipment according to claim 1, which further comprises an abnormality detecting means which counts a time from a previous time of detecting the origin to a present time of detecting the origin; and judges that there is an abnormality when the counted time is not within a predetermined range.

6. Distance measuring equipment according to claim 3, further comprising an abnormality detecting means which judges that there is an abnormality when the exciting phase of the stepping motor is a phase other than a predetermined phase in a case where the origin detecting means detects the origin.

* * * * *